United States Patent [19]

Robertson et al.

[11] Patent Number: 5,513,303
[45] Date of Patent: * Apr. 30, 1996

[54] MOVING AN OBJECT IN A THREE-DIMENSIONAL WORKSPACE

[75] Inventors: George G. Robertson; Jock Mackinlay, both of Palo Alto; Stuart K. Card, Los Altos Hills, all of Calif.

[73] Assignee: Xerox Corporation, Stamford, Conn.

[ * ] Notice: The portion of the term of this patent subsequent to Jan. 4, 2011, has been disclaimed.

[21] Appl. No.: 286,764

[22] Filed: Aug. 5, 1994

Related U.S. Application Data

[63] Continuation of Ser. No. 562,048, Aug. 2, 1990, Pat. No. 5,359,703.

[51] Int. Cl.⁶ .............................. G06T 15/70; G06F 3/00
[52] U.S. Cl. .................. 395/119; 395/155; 395/127; 395/152
[58] Field of Search .................................. 395/119, 127, 395/161, 138, 152, 155, 136; 345/139, 122, 121

[56] References Cited

U.S. PATENT DOCUMENTS

| | | | |
|---|---|---|---|
| 4,734,690 | 3/1988 | Waller | 395/127 |
| 4,766,423 | 8/1988 | Ono et al. | 395/127 X |
| 4,807,158 | 2/1989 | Blanton et al. | 395/152 X |
| 4,987,527 | 1/1991 | Hamada et al. | 395/127 X |
| 5,129,054 | 7/1992 | Alstad et al. | 395/155 |
| 5,276,785 | 1/1994 | Mackinlay et al. | 395/127 |
| 5,359,703 | 10/1994 | Robertson et al. | 395/119 |

OTHER PUBLICATIONS

Brunn et al., "An Interactive 3D-graphics User Interface for Engineering Design", INTERACT '87, Sep. 1987.
van Emmerik et al., "Direct Manipulation of 3D Objects with a 2D Input Device", Automatika, Jun. 1990.
Smith, "The Alternate Reality Kit An Animated Environment for Creating Interactive Simulations", IEEE, 1986.
Nielson et al., "Direct Manipulation Techniques for 3D Objects Using 2D Locator Devices", Proceedings, Workshop on Interactive 3D Graphics, 1986, pp. 175–182.
Bier, "Skitters and Jacks: Interactive 3D Positioning Tools", Proceedings, Workshop on Interactive 3D Graphics, 1986, pp. 183–196.
Bier, "Snap–Dragging in Three Dimensions", Computer Graphics, vol. 24, No. 2, Mar. 1990, pp. 193–204.
Phillips et al., "Jack: A Toolkit for Manipulating Articulated Figures", Proceedings, User Interface Software, ACM, 1988, pp. 221–229.
Ware et al., "Exploration and Vitural Camera Control in Virtual Three Dimensional Environments", Computer Graphics, vol. 24, No. 4, Mar. 1990, pp. 175–183.

*Primary Examiner*—Raymond J. Bayerl

[57] ABSTRACT

In response to user signals requesting motion of a displayed object, a system presents a sequence of images, each including an object perceptible as a moved continuation of the previously displayed object. The user can independently request radial motion and lateral motion, and the system presents a sequence of images in which the object is displaced radially by the requested radial motion and laterally by the requested lateral motion. The user can request lateral motion by operating a mouse and can request radial motion by operating keys on a keyboard, with one key requesting motion toward a radial source and another key requesting motion away from the radial source. The radial source can be the viewpoint. The object's motion toward the viewpoint includes two phases. In the first phase, the object follows an acceleration path, enabling the user to control motion near its starting point and providing increasingly rapid motion; in the second phase, it follows an asymptotic path, enabling the user to control its motion as it approaches the viewpoint and preventing it from passing the viewpoint. The displacements between positions on the asymptotic path can follow a logarithmic function, with each displacement a proportion of the distance from the previous position to the viewpoint. The phases can be produced by using the logarithmic function to clip an acceleration function. The same rate of acceleration can be applied when the user requests motion away from the viewpoint. The processor can perform an animation loop, each step of which receives user signals and presents another image.

32 Claims, 9 Drawing Sheets

MOVING AN OBJECT IN A THREE-DIMENSIONAL WORKSPACE

This is a continuation, of application Ser. No. 07/562,048, filed Aug. 2, 1990, now U.S. Pat. No. 5,359,703.

BACKGROUND OF THE INVENTION

The present invention relates to techniques for producing the perception of control over movement of an object within a three-dimensional workspace presented on a display.

Bier, E. A. and Stone, M. C., "Snap-Dragging," *Computer Graphics*, Vol. 20, No. 4, 1986, pp. 233–240, describe snap-dragging, a technique that helps a user to place points with precision using an interactive drawing system. As described in Section 1, snap-dragging is based on the idea of snapping the display cursor to points and curves using a gravity function. Section 2 describes snap-dragging in detail, mentioning at page 233 that transformed objects are smoothly dragged into position. The user specifies which region and which kinds of alignment objects are of interest, and the system automatically constructs alignment objects of that kind in the region. The alignment objects are visible when a user is moving an object. Section 4.3, discussing performance, mentions that an object affected by a transformation must move smoothly as it is dragged into position, which can be solved by reducing detail during dragging or rendering moving objects into a bitmap that is repeatedly repositioned. The last paragraph on page 239 discusses editing objects in three dimensions.

Bier, E. A., "Skitters and Jacks: Interactive 3D Positioning Tools," *Proceedings, 1986 Workshop on Interactive 3D Graphics*, Oct. 23–24, 1986, ACM, New York, 1987, pp. 183–196, describes interactive techniques for scene composition, the precise placement of scene objects relative to each other using affine transformations. Section 2 describes smooth object motion in which objects move through intermediate configurations in real time until they reach their final destinations. Section 2.4 indicates that smoothness is useful for obtaining an aesthetically pleasing relationship between objects and to give the user confidence. Section 4.1 describes how skitters move when the user moves a two dimensional cursor around the screen, and appear on the surface of an object, as illustrated in FIG. 1. Section 4.5 further describes how a skitter can be moved using a mouse. Section 5.3 describes smooth motion transformations parallel to the viewing plane or parallel to a PlaneSelection plane. Also, an object can be attached to a skitter which can then be moved normally.

SUMMARY OF THE INVENTION

The present invention provides techniques for operating a system to produce the perception of control over movement of an object in a three-dimensional workspace presented on a display. The user can independently request radial motion and lateral motion of the object. When moved radially toward a source, which could be the user's viewpoint, the object first accelerates, then follows an asymptotic path that approaches but does not reach the viewpoint so that its approach to the viewpoint can be controlled. When moved radially away from the user's viewpoint, the object accelerates.

One aspect of the invention is based on the recognition of a problem in moving objects in a three-dimensional workspace. Conventional object movement techniques are complex, because a user must indicate displacements for each affected degree of freedom. For most object motions in three dimensions, the user must indicate a complicated series of displacements.

This aspect of the invention is further based on the discovery of a simpler technique for moving an object in a three-dimensional workspace. With this technique, the user can produce a desired object motion by independently requesting two types of motion, each of which is intuitive and simple.

One type of motion is radial motion along rays within the workspace. The motion can be radial in relation to the user's viewpoint, with each ray extending from the viewpoint through the center of the object. The user can control radial motion by using keys to select from a few simple choices, such as moving the object toward the viewpoint, moving the object away from the viewpoint, or keeping the object at the previous radial position.

The other type of motion is lateral motion in directions extending laterally from the rays, such as motion in a planar or spherical surface intersected by the rays. The user can control lateral motion using a two-dimensional user input device such as a mouse to indicate changes in position.

Independently requesting radial and lateral motion as described above is especially effective because a typical user can readily request both types of motion at the same time to move an object directly from a starting position to a destination. For example, a user could use one hand to request radial motion while using the other hand to request lateral motion. Furthermore, the combination of the two types of motion is adequate to move an object from a starting position to any other position in the user's field of view within the three-dimensional workspace.

A related aspect of the invention is based on the recognition of a problem in moving an object in a three-dimensional workspace. If motion is rapid, the user has difficulty controlling the motion so that the object stops at an appropriate position. But if the object moves too slowly, the motion requires too much time. Conventional object motion techniques do not handle this conflict satisfactorily.

This aspect is further based on the discovery that this problem can be solved by performing object motion in two phases. In the first phase, the object follows an acceleration path, moving more rapidly as the duration of the motion increases; using this phase, the user can make short, controlled movements of the object or longer, rapid movements. If the first phase continues sufficiently long, the second phase begins, in which the object follows an asymptotic path that approaches but does not reach a destination point such as the viewpoint, allowing the user to control the object as it approaches the destination point.

Two-phase motion as described above can be implemented by applying a constant rate acceleration function clipped by a logarithmic function. The logarithmic function can, at each animation step, reduce the distance from the object to the viewpoint by a constant proportion. If two-phase motion is used for moving an object toward the viewpoint in a three-dimensional workspace, for example, the object can also be moved away from the viewpoint by applying a constant rate acceleration function, which can have the same rate as the function for accelerating toward the viewpoint.

Lateral motion can also be clipped where it encounters walls or other objects in a three-dimensional workspace. To provide additional control in positioning a moving object near another object such as a wall, a logarithmic function could similarly be used to clip lateral movement as the moving object approaches the other object, providing an asymptotic approach.

The following description, the drawings and the claims further set forth these and other objects, features and advantages of the invention.

DETAILED DESCRIPTION

A. Conceptual Framework

Figure 1:
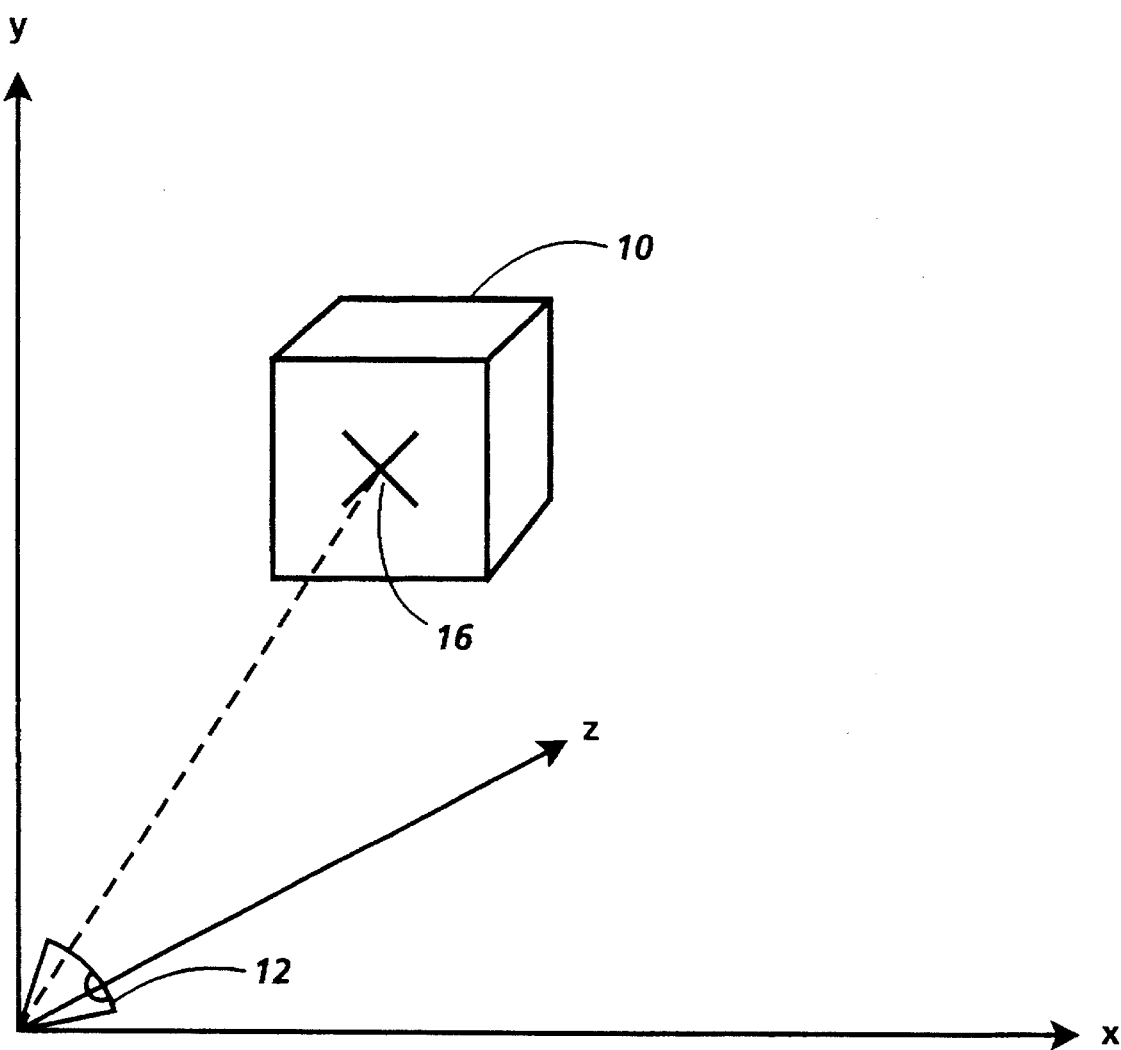
FIG. 1 is a schematic view of an object perceptible in a three-dimensional workspace.

The following conceptual framework is helpful in understanding the broad scope of the invention, and the terms defined below have the meanings indicated throughout this application, including the claims. This conceptual framework is a modification and extension of that set forth in copending, coassigned U.S. patent application Ser. No. 07/488,487, now continued as Ser. No. 08/023,466 and issued as U.S. Pat. No. 5,339,390, entitled "Display of a Workspace with Stretching," incorporated herein by reference.

A "data processing system" is a system that processes data. A "data processor" or "processor" is any component or system that can process data, and may include one or more central processing units or other processing components.

"User input means" is means for providing signals based on actions of a user. User input means can include one or more "user input devices" that provide signals based on actions of a user, such as a keyboard or a mouse. The set of signals provided by user input means can therefore include data indicating mouse operation and data indicating keyboard operation.

An "image" is a pattern of light. An "image output device" is a device that can provide output defining an image. A "display" is an image output device that provides output that defines an image in a visible form. A display may, for example, include a cathode ray tube; an array of light emitting, reflecting, or absorbing elements; a structure that presents marks on paper or another medium; or any other structure capable of defining an image in a visible form. To "present an image" on a display is to operate the display so that a viewer can perceive the image.

A wide variety of display techniques for data processing systems are available including, for example, various graphical user interfaces, but, despite their diversity, these techniques have certain common characteristics. One fundamental common characteristic is that a display produces human perceptions. In this application, the term "display feature" refers to any human perception produced by a display.

A "display object" or "object" is a display feature that is perceptible as a coherent unity. An image "includes" an object if presentation of the image can produce perception of the object.

A "workspace" is perceived when objects or other display features in an image are perceived as having positions in a space. A "three-dimensional workspace" is a workspace that is perceived as extending in three orthogonal dimensions. Typically, a display has a two-dimensional display surface and the perception of a third dimension is produced by visual clues such as perspective lines extending toward a vanishing point; obscuring of distant objects by near objects; size changes in objects moving toward or away from the viewer; perspective shaping of objects; different shading of objects at different distances from the viewer, and so forth. Three-dimensional workspaces include not only workspaces in which all of these cues combine to produce the perception of three dimensions, but also workspaces in which a single cue can produce the perception of three dimensions. For example, a workspace with overlapping display objects or a workspace within which a view can zoom in on an object can be a three-dimensional workspace even though objects within it are presented in orthographic projection, without perspective.

A three-dimensional workspace is typically perceived as being viewed from a position within the workspace, and this position is the "viewpoint."

In order to present a three-dimensional workspace, a system may store data indicating "coordinates" of the position of an object or other display feature in the workspace. Data indicating coordinates of a display feature can then be used in presenting the display feature so that it is perceptible as positioned at the indicated coordinates. The "distance" between two display features is the perceptible distance between them, and can be determined from their coordinates if they are presented so that they appear to be positioned at their coordinates.

A second display feature is perceptible as a "continuation" of a first display feature when presentation of the second display feature follows presentation of the first display feature in such a way that the user perceives the first display feature as being continued when the second display feature is presented. This can occur when the successive display of two display features is so close in time and space that they appear to be the same display feature. An example of this is the phenomenon called "object constancy."

An "animation loop" is a repeated operation in which each repetition presents an image and in which objects and other display features in each image appear to be continuations of objects and display features in the next preceding image. If the user is providing signals through a user input means, the signals can be queued as events and each loop can handle some events from the queue.

A second display feature is perceptible as a "moved continuation" of a first display feature if it is perceptible as a continuation in a different position. The first display feature is perceived as "moving" or as having "movement" or "motion" or as being "displaced" within a workspace. A "displacement" is a distance by which a feature is perceived as being displaced within a workspace.

"Radial motion" or "radial displacement" is perceived as motion or displacement along one or more rays. A ray extends from a "radial source." The viewpoint can be the radial source for radial motion.

"Lateral motion" or "lateral displacement" is perceived as motion or displacement in a direction lateral to one or more rays. In order to present an object with lateral motion, a system may store data defining a "surface" within which the object can move in directions lateral to one or more rays. The surface may be planar or spherical, for example.

Signals from user input means can request radial motion and lateral motion. If the user can request radial and lateral motion separately and can request both types of motion simultaneously, the user input means is structured so that the user can request radial motion and lateral motion "independently." For example, the user can operate a mouse or other pointing device to request lateral motion with one hand and can independently operate keys on a keyboard to request radial motion with the other hand.

A moving object is perceived as following a "path" within a workspace. An "acceleration path" is a path on which the perceived velocity increases. An "asymptotic path," on the other hand, is a path on which the perceived velocity decreases such that the path approaches but does not reach an asymptote.

When an object is perceived as following an acceleration path, the displacements between successive positions follow an "acceleration function." Similarly, when an object is perceived as following an asymptotic path, the displacements between successive positions follow an "asymptotic function."

An example of an acceleration function is the square of time, where time can be measured by the number of preceding positions on the path. A "rate of acceleration" is a scalar that is multiplied by the square of time to obtain the magnitude of each displacement on an acceleration path.

An example of an asymptotic function is a function in which a logarithm approaches zero asymptotically as time increases. The term "logarithmic function" includes such functions as well as functions that approximate them.

A "function of a distance" between two points or positions is a function that produces, for each of a set of distances, a set of respective values. For example, one simple logarithmic function of the distance between two points or positions can be obtained by taking a "proportion" of the distance, meaning a part of the distance that is greater than zero but less than the entire distance. A proportion of a distance can be obtained by multiplying the distance by a "proportionality constant," with the proportionality constant having a magnitude greater than zero and less than one.

A "clipping operation" is performed on two functions when both are computed and one of the two is then chosen by applying a criterion. The criterion can, for example, choose the maximum or the minimum of the results. A clipping operation may be described as clipping one function with another function.

B. General Features

Figure 2A:
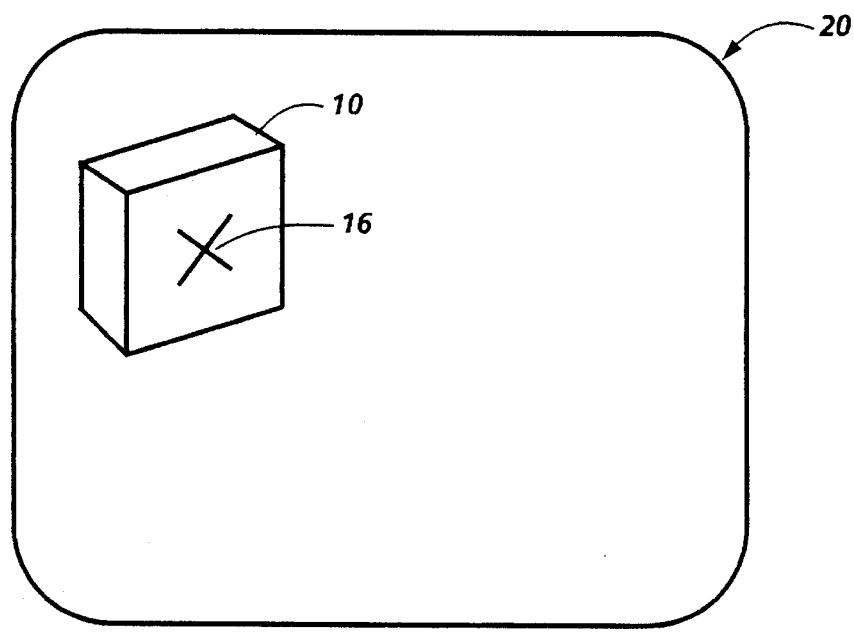
FIG. 2A is a schematic view of a presented image that includes the object shown in FIG. 1.
Figure 2B:
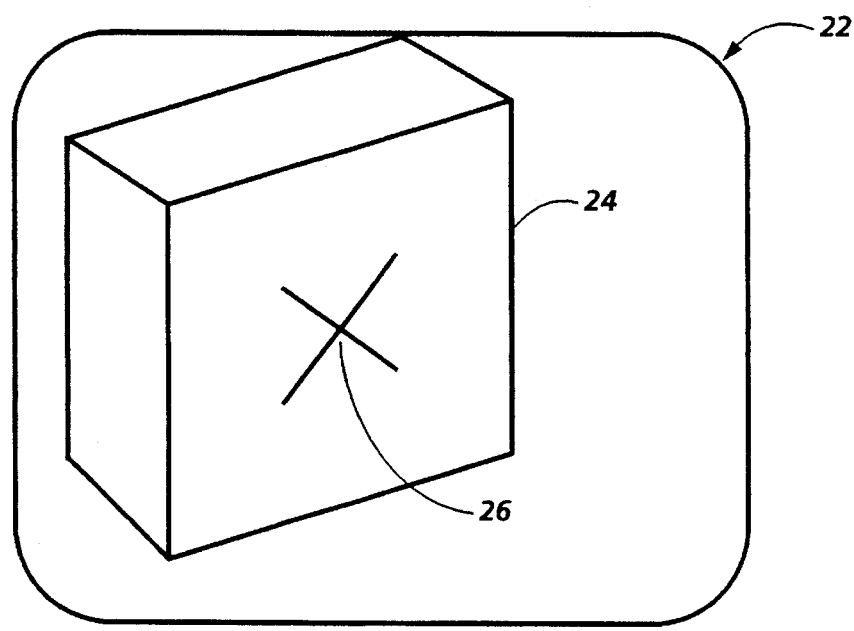
FIG. 2B is a schematic view of another presented image that includes an object that is perceptible as a moved continuation of the object of FIG. 2A.
Figure 3:
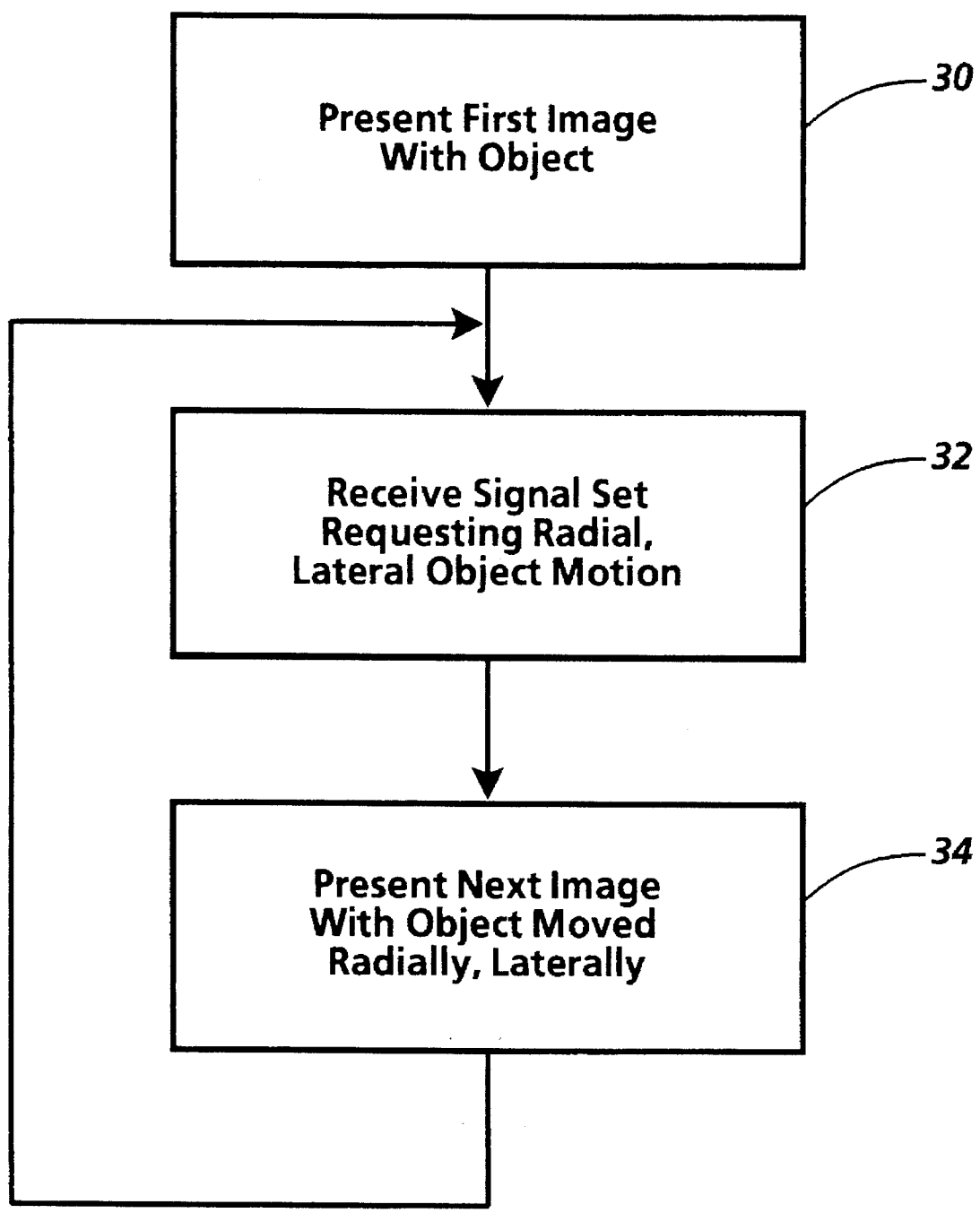
FIG. 3 is a flow chart showing general steps in presenting a sequence of images in response to signals requesting radial and lateral motion of an object.
Figure 4:
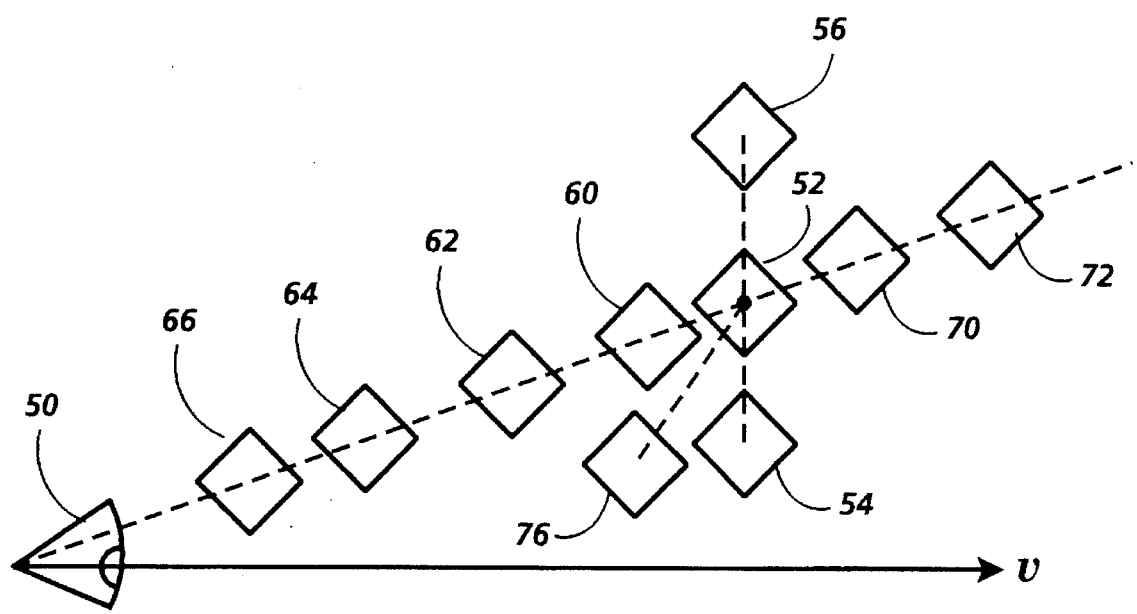
FIG. 4 is a plane view showing object positions in lateral and radial motion.
Figure 5:
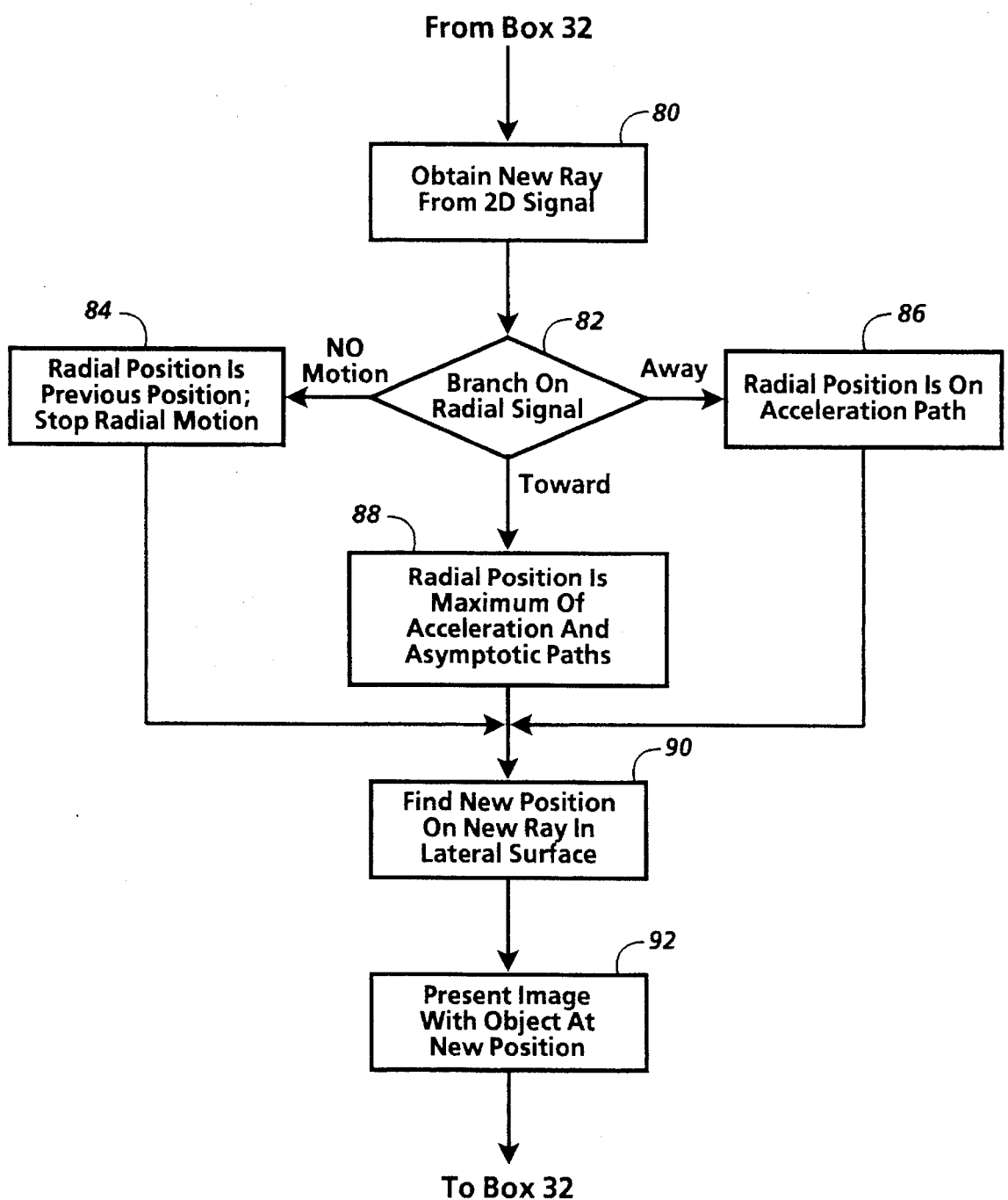
FIG. 5 is a flow chart showing general steps in presenting an object at a new position in response to a request for lateral and radial motion.

FIGS. 1–5 illustrate general features of the invention. FIG. 1 shows an object perceptible in a three-dimensional workspace. FIGS. 2A and 2B show images before and after object motion toward a viewpoint. FIG. 3 is a flow chart showing general steps in presenting a sequence of images with radial and lateral object motion. FIG. 4 is a plane view showing lateral and radial object motion in relation to a viewpoint. FIG. 5 is a flow chart showing general steps in lateral and radial object motion to a new position.

FIG. 1 shows object 10, perceptible as being viewed from viewpoint 12 in a three-dimensional workspace. Viewpoint 12 is shown at the origin of a coordinate system, oriented with its axis of viewing along the z axis. A dashed line extends from viewpoint 12 to point 16 on object 10, which is a center point for object 10.

FIG. 2A shows image 20, within which object 10 is perceptible as viewed from viewpoint 12 in a three-dimensional workspace. FIG. 2B shows image 22, with object 24 including center point 26. By presenting an appropriate sequence of images, object 24 can be perceptible as a continuation of object 10 but positioned at a different location in the three-dimensional workspace. When a user indicates object 10 and requests object movement toward the viewpoint, a system presenting image 20 can respond with a sequence of images ending in image 22 so that the user can see object 10 in greater detail.

FIG. 3 shows general steps a system can perform in presenting such a sequence. The step in box 30 presents the first image of the sequence, including an object that is perceptible at; being viewed from a viewpoint in a three-dimensional workspace. The step in box 32 receives a signal set from a user input device requesting radial motion and lateral motion. In response, the step in box 34 presents another image that is perceptible as a view with the object moved radially and laterally. The steps in box 32 and 34 can be repeated until a satisfactory image is obtained.

FIG. 4 illustrates a technique for moving an object laterally and radially relative to viewpoint 50, which is oriented with its direction of view along the v axis, an axis defined as the direction of view, with its origin at the viewpoint. In FIG. 4, the rays along which radial motion occurs extend from viewpoint 50 through the center of the object, but radial motion could occur along rays extending from a different point through the object. The surface of lateral motion can, as shown, be a plane perpendicular to the v axis, so that an object at position 52 can be moved laterally to various positions in the plane including positions 54 and 56. The surface of lateral motion could alternatively be a plane perpendicular to the ray through the object at its current position, a spherical or cylindrical surface centered at the source of the rays with a radius equal to the distance from the source to the object, a polyhedral surface approximating such a spherical surface, or another appropriate surface.

Position 52 is also shown as the first in a sequence of positions by which an object can move toward viewpoint 50 through radial motion. Positions 60 and 62 illustrate a first phase of radial motion in which the object accelerates toward viewpoint 50 as a function of time; images with the object at these positions can be presented in response to a sequence of signals requesting object motion toward viewpoint 50 from position 52. Positions 64 and 66 illustrate a second phase of radial motion in which the object approaches viewpoint 50 along an asymptotic path, moving progressively slower as it approaches so that the user can control motion more easily at closer range; images with the object at these positions can be presented in response to a sequence of signals requesting object motion toward viewpoint 50.

Position 52 is further shown as the first in a sequence of positions by which an object can move away from viewpoint

50 through radial motion. Positions 70 and 72 illustrate radial motion in which the object accelerates as a function of time. Images with the object at these positions can be presented in response to a sequence of signals requesting object motion away from viewpoint 50.

Radial and lateral motion can be performed at the same time. For example, position 76 illustrates simultaneous lateral motion toward the v axis and radial motion toward viewpoint 50.

Each type of motion shown in FIG. 4 can be centered at an appropriate point within the object. The object can remain at position 52 in response to signals requesting no radial or lateral motion.

FIG. 5 shows steps within the step in box 34 in FIG. 3 that can provide lateral and radial motion as illustrated in FIG. 4. The step in box 80 begins by obtaining a new ray from a two-dimensional signal, which can be received in the step in box 32 in FIG. 3 from a mouse or other pointing device. The new ray can be indicated by a unit vector with the same source as the previous ray, for example, and will ordinarily be close to the direction of the previous ray because movement of a mechanical pointing device by a user is relatively slow compared to the speed of computation.

The step in box 82 branches based on a signal selecting a type of radial motion, which can be received in the step in box 32 in FIG. 3 from keys on a keyboard or mouse. If the signal selects no radial motion, the step in box 84 takes the previous position as the radial position and stops radial motion. If the signal selects radial motion away from the source of the rays, the step in box 86 takes as the radial position the next position on an acceleration path. If the signal selects radial motion toward the source of the rays, the step in box 88 takes as the radial position the maximum of the next positions on an acceleration path and an asymptotic path, the maximum being the next position that is farther from the source of the rays. Therefore, during uninterrupted radial motion toward the :source, the object accelerates at first and then moves along an asymptotic path. The step in box 88 can be performed by clipping an acceleration function with an asymptotic function.

When the radial position has been obtained, the step in box 90 finds a point on the new ray that is also in a surface extending laterally from the radial position. This point is the new position at which the object is then presented in box 92, so that the object is perceptible as moving laterally and radially as requested by the signals received in box 32. The step in box 90 can be performed by using the radial position from box 84, 86, or 88 to find the appropriate lateral surface, and by then finding the intersection of the lateral surface with the new ray.

C. An Implementation

The invention could be implemented on various data processing systems. It has been successfully implemented on a Silicon Graphics Iris workstation that includes the graphics engine option.

1. The System

Figure 6:
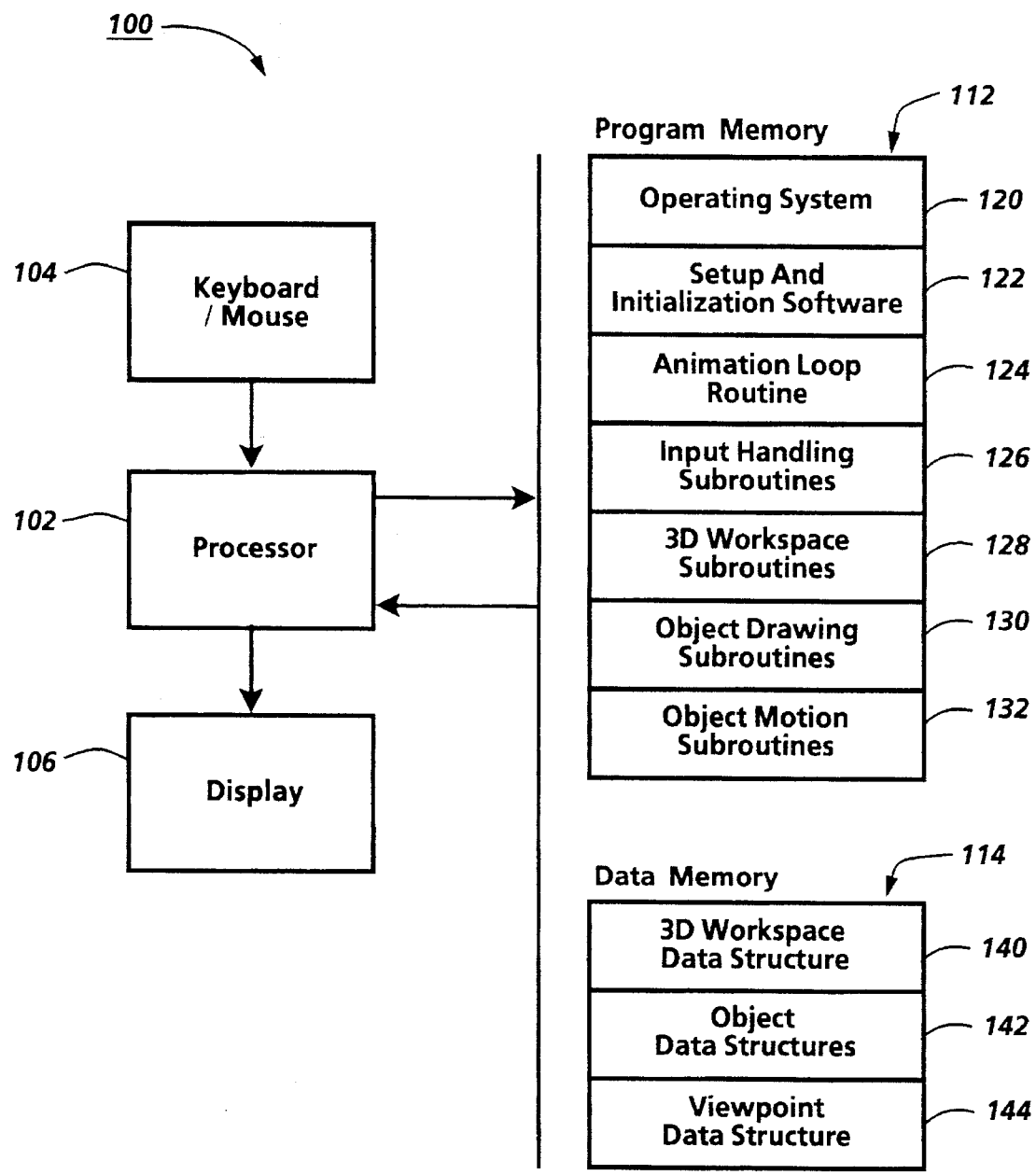
FIG. 6 is a block diagram showing components in a system that provides object motion.

FIG. 6 shows components of a system implementing the invention, including relevant items in memory. System 100 includes processor 102 which is connected for receiving input signals from keyboard and mouse 104 and for presenting images on display 106. Processor 102 operates by accessing program memory 112 to retrieve instructions, which it then executes.

During execution of instructions, processor 102 may access data memory 114, in addition to receiving input signals and presenting images.

Program memory 112 includes operating system 120, which includes instructions for performing graphics operations, all of which is part of the Silicon Graphics Iris workstation with graphics engine. In preparation for an interactive session, processor 102 executes setup and initialization software 122. In the current implementation, processor 102 is set up to execute Common Lisp and Common Lisp Object System code and is initialized with parameters, several of which are mentioned below. The other routines in program memory 112 in FIG. 6 are implemented with Common Lisp Object System classes and methods.

In response to an appropriate call, processor 102 executes animation loop routine 124, which includes a loop that continues until terminated by an appropriate signal from keyboard and mouse 104. Each cycle of the loop can use double buffer techniques to present a respective image on display 106, with the respective images together forming a sequence such that display features in each image appear to be continuations of display features in the previous image in accordance with object constancy techniques.

Each animation cycle includes a call to input handling subroutines 126 to receive and handle the next item on a FIFO event queue maintained by operating system 120. The event queue includes signals from the user such as keystrokes, mouse events, mouse pointer movement into or out of a window, and mouse pointer movement reshaping or moving a window, and can also include events from other sources such as from another process.

Each animation cycle also includes a call to 3D workspace subroutines 128 to redraw the three-dimensional workspace. In redrawing the workspace, 3D workspace subroutines 128 call object drawing subroutines 130 to redraw each object in the workspace. Object drawing subroutines 130 in turn call object motion subroutines 132 to determine the current position of each object.

Data memory 114 includes 3D workspace data structure 140, object data structures 142, viewpoint data structure 144, as well as other data stored and accessed during execution of instructions in program memory 112. 3D workspace data structure 140 can include a list of objects in the workspace and data indicating the extent of the workspace. Object data structures 142 can include, for each object, a type indicating its geometric shape, a position within the three-dimensional workspace, an extent indicating a region such as a cube or sphere that includes the object, and a list of other objects that are attached to the object, if any. The center of the extent can be used in object motion, under the assumption that the object is centered within its extent. Viewpoint data structure 144 can include data indicating a position of the viewpoint, a direction of gaze, and a direction of body.

2. The Animation Loop

Figure 7:
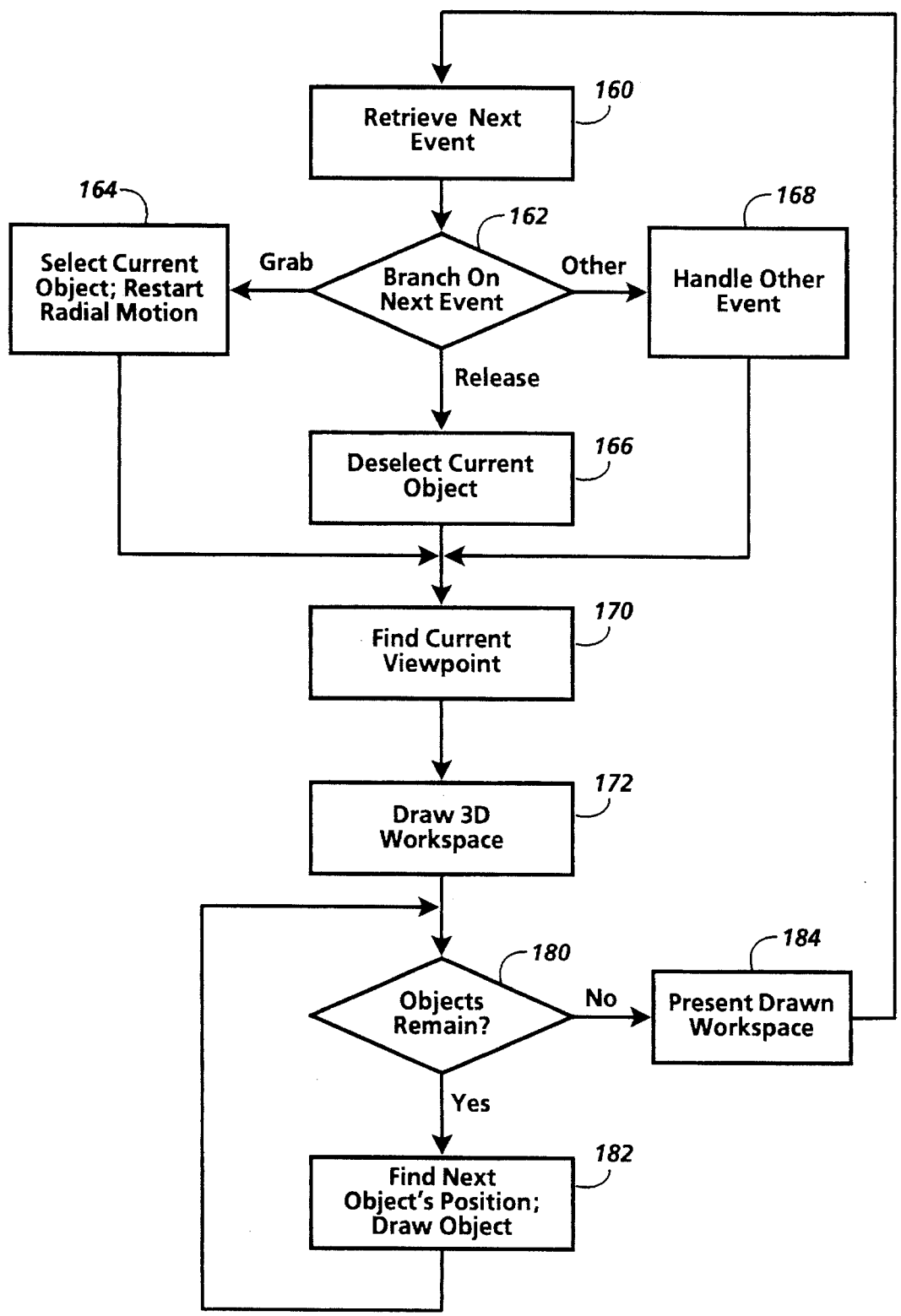
FIG. 7 is a flow chart showing steps in an animation loop that provides object motion.

Animation loop routine 124 could be implemented in various ways. FIG. 7 shows relevant steps of an animation loop executed in the current implementation of the invention.

The step in box 160 retrieves the next event from the event queue for handling. The step in box 162 branches based on the next event. If the next event is a signal grabbing an object, implemented as a left mouse button down click, the step in box 164 performs a pick operation to find the object currently pointed to; sets a current selection variable to indicate that the object pointed to is currently selected; clears radial motion step counts to restart radial motion for the newly selected object; and performs other appropriate operations for the newly selected object, such as an animated script to indicate that it is the currently selected object. On the other hand, if the next event is a signal releasing the previously grabbed object, implemented as a left mouse button up click, the step in box 166 resets the current selection variable to indicate that the object is no longer currently selected. If the next event is another signal, it is handled appropriately in box 168. The step in box 168 may include storing data indicating a key click or other input signal received.

The step in box 170 finds the current viewpoint position for use in redrawing the workspace. The step may include techniques like those described in copending, coassigned U.S. patent application Ser. No. 07/561,627, now issued as U.S. Pat. No. 5,276,785 (Attorney Docket No. D/90296), entitled "Moving Viewpoint with Respect to a Target in a Three-Dimensional Workspace," incorporated herein by reference. In the simplest case, the viewpoint does not move, so that the previous viewpoint position can be retrieved by accessing viewpoint data structure 144.

The step in box 172 draws the three-dimensional workspace for viewing from the current viewpoint. This step can draw the workspace with various cues to promote the perception of three dimensions, including corners, shading, and other visual cues to indicate walls, a ceiling, and a floor. This step can include accessing workspace data structure 140 to retrieve the extent of the workspace.

The step in box 180 begins an iterative loop that draws each object. As noted above, workspace data structure 140 includes a list of the objects in the workspace, and this list can be followed by the iterative loop. The step in box 182 performs operations discussed in greater detail below to find the position of the next object on the list and to draw the object at its position. Object data structures 142 can be accessed to retrieve data for each object.

When all the objects have been drawn, the step in box 184 switches buffers so that the workspace and objects drawn in boxes 172 and 182 are presented on display 106. Then, the loop returns to its beginning.

The animation loop can include various additional operations. For example, if the viewpoint is moved into a position so that it bumps against a wall of the workspace, the view of the workspace can be greyed to give a visual cue.

3. Drawing an Object

Figure 8:
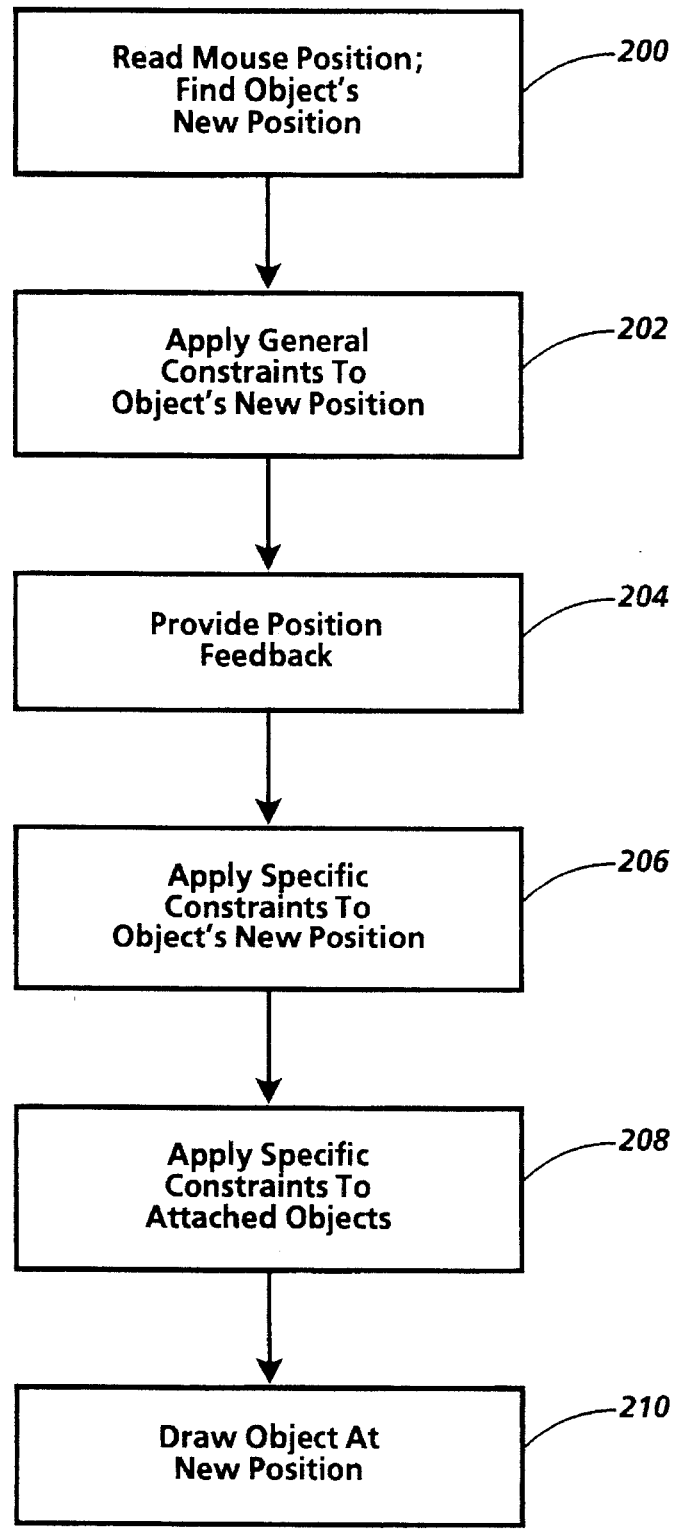
FIG. 8 is a flow chart showing steps for finding an object's position and redrawing the object.

The step in box 182 in FIG. 7 could be implemented in various ways for various objects. FIG. 8 shows general steps that can be followed to allow flexibility in implementing the step in box 182 for different types of objects.

The step in box 200 reads the mouse position and uses it and other data indicating signals from the user to find the new position of the object. The step in box 200 does not, however, take into account constraints on the motion of the object.

The step in box 202 applies general constraints that are applicable to all objects. For example, if the workspace is bounded by walls, the step in box 202 can apply a clipping function to the new position obtained in box 200 so that it does not leave part of the object outside the walls. The clipping function can ensure that the center position of the object does not come closer to a wall than half the width of the object's extent.

The step in box 204 provides position feedback to assist the user in perceiving the position of an object being moved. In a workspace in which the object can be freely positioned, a grid showing the object's position in relation to the walls may be helpful. In a workspace in which the object is attracted to one of a number of other objects, the other object to which it is currently attracted can be highlighted to provide feedback. Another way to provide feedback is to drop a shadow from the object to whatever surfaces are below it, with the shadow showing which surface the object would fall onto if dropped. The technique for providing feedback can be determined by one of the variables set during initialization.

The steps in box 200, 202, and 204 are applicable to any object and can therefore be implemented with a subroutine that is the same for any object. The remaining steps in FIG. 8 are specific to the type of object, and therefore must be separately implemented for each type of object.

The step in box 206 applies specific constraints to the object's position. For example, if the object is an object that must stand on the floor, the step in box 206 can change the new position so that the object is standing on the floor. If the object, when released, comes to rest either on the upper surface of another object or on the floor, the step in box 206 can apply a test to determine whether the new position is over the upper surface or the floor, moving the new position as appropriate so that the object will land in a stable position on the upper surface or on the floor. A specific constraint could include a snap-dragging or gravity function so that an object forms a well of attraction; when another object enters the well of attraction, it snaps to a position next to the object with the well of attraction.

The step in box 208 applies specific constraints to other objects that are attached to the object. For example, if other objects are resting on the upper surface of an object being moved, the step in box 208 can change the positions of the other objects so that they remain on the upper surface as the object moves.

The step in box 210 completes the operation by drawing the object at the new position.

4. Object Motion

Figure 9:
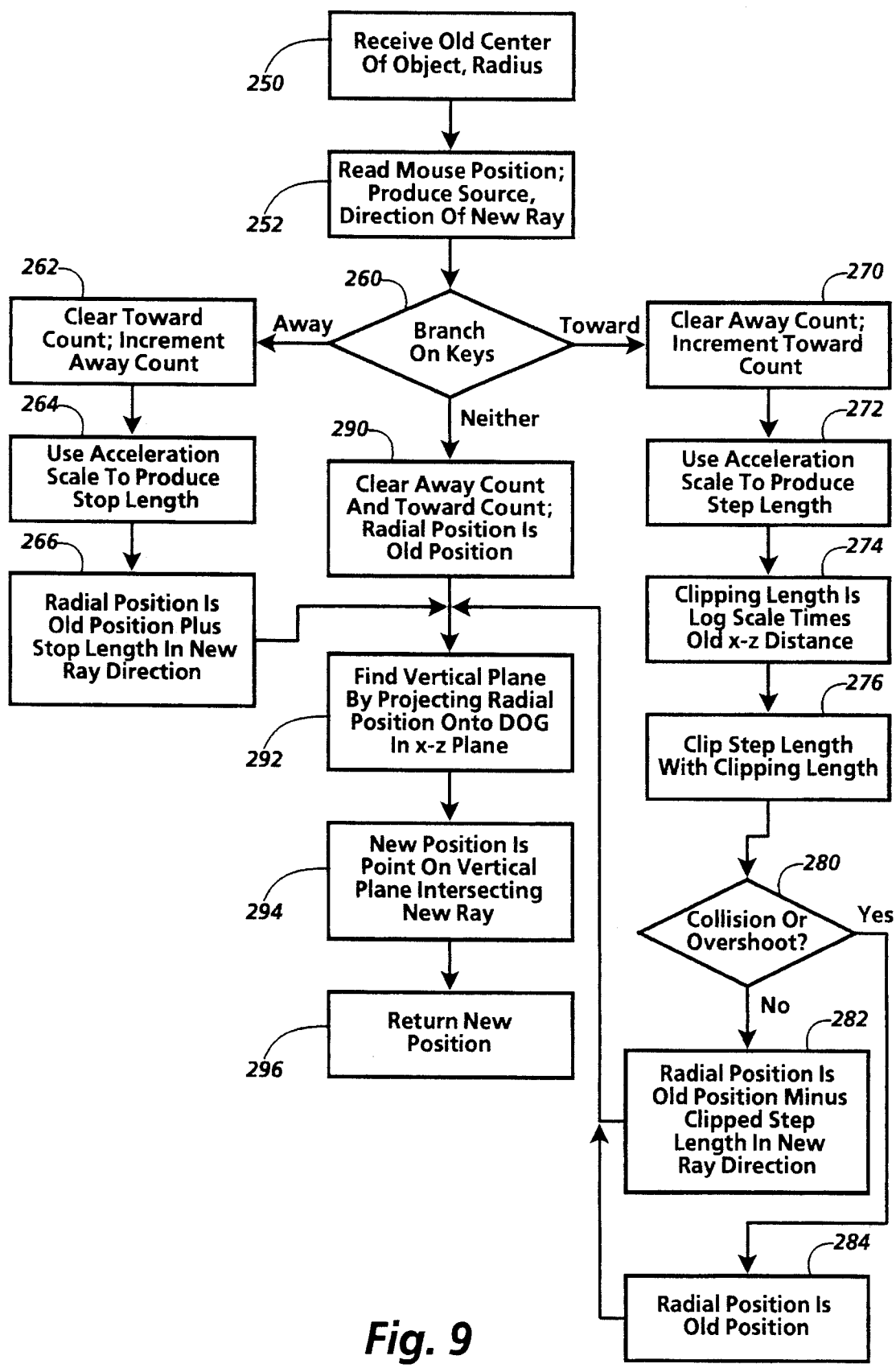
FIG. 9 is a flow chart showing detailed steps for finding an object's new position.

An object can be perceived as moving if the change in position from one animation step to another and the time per animation step are sufficiently small, due to the phenomenon of object constancy. The step in box 200, which finds the position of the object in each animation step, could be performed in various ways. FIG. 9 shows how the step in box 200 can be implemented with a subroutine that generally follows the steps in FIG. 5.

The step in box 250 begins by receiving coordinates indicating the old center of the object and an estimated radius of the object. The coordinates indicating the old center can be obtained by adding half the width, depth, and height of the extent to the coordinates of the corner of the extent closest to the origin. The radius can be estimated by multiplying the larger of the depth and width of the extent by 0.55.

The step in box 252 reads the current mouse position and uses the two-dimensional coordinates of the position indicated by the mouse to produce data indicating the source and direction of a new ray extending from the viewpoint through the position indicated by the mouse. On the Silicon Graphics workstation, the mapw function can be used to obtain the coordinates of this ray using the coordinates of the current mouse position. Before calling the mapw function, an appropriate transformation matrix is set up using viewpoint data structure 144. The coordinates returned by the mapw function can then be used to produce a unit vector indicating the direction of the new ray.

The step in box 260 branches based on keys that indicate radial motion. The space bar can indicate motion away from the viewpoint and the left alt key can indicate motion toward the viewpoint. If both are pushed, motion away from the viewpoint can be provided. If neither is pushed, the object does not move radially.

To move the object away from the viewpoint, the step in box 262 begins by clearing a count of steps toward the viewpoint and increments a count of steps away from the viewpoint. The step in box 264 uses an acceleration scale set during initialization to produce a step length. The step length can be produced by multiplying the square of the count of steps away from the viewpoint by the acceleration scale. The choice of an acceleration scale depends on the speed of the animation loop being used; an acceleration scale of 0.04 has been used to produce satisfactory motion. The step in box 266 produces a radial position by performing vector addition. This step adds to the old center position from box 250 a vector whose length is the step length from box 264 and whose direction is the new ray direction from box 252. Because the new ray direction is approximately the same as the old ray direction from the viewpoint to the old center position, the effect of this step is to move away from the viewpoint approximately along a ray from the viewpoint through the old position. This approximation conveniently avoids the computation of a ray direction from the viewpoint to the old center position.

To move the object toward the viewpoint, the step in box 270 begins by clearing the away count and incrementing the toward count. The step in box 272 performs the same calculation as in box 264 to produce the step length.

The step in box 274 produces a clipping length by multiplying a log scale set during initialization by the distance in the x-z plane from the viewpoint to the old center position. The choice of a log scale depends on the speed of the animation loop being used; an log scale of 0.03 has been used to produce satisfactory motion. The step in box 276 clips the step length from box 272 by the clipping length from box 274, so that the clipped step length is the shorter of the step length and the clipping length.

The step in box 280 tests the clipped step length to determine whether it is shorter than the distance in the x-z plane from the viewpoint to the old center position and longer than the estimated radius. If so, moving the object by the clipped step length does not lead to a collision and does not overshoot the viewpoint. Therefore, the step in box 282 produces a radial position by performing vector subtraction. This step subtracts from the old center position from box 250 a vector whose length is the clipped step length from box 276 and whose direction is the new ray direction from box 252. Because the new ray direction is approximately the same as the old ray direction from the viewpoint to the old center position, the effect of this step is to move toward the viewpoint approximately along the ray from the viewpoint through the old position. As above, this approximation avoids the computation of an old ray direction.

If the step in box 280 determines that the clipped step length leads to a collision or an overshoot, the radial position is the old center position from box 250, as indicated in box 284. Similarly, if the keys indicate neither motion away from the viewpoint nor toward the viewpoint, the step in box 290 clears the away count and the toward count and the radial position is the old center position from box 250.

The new ray direction and a lateral surface would be sufficient to define the new position of the object. Therefore, the step in box 292 finds a lateral surface using the radial position. In this implementation, the lateral surface is a vertical plane that is perpendicular to the x- and z-components of the direction of gaze, retrieved from viewpoint data structure 144. A vertical plane is used to avoid problems with clipping at the floor and ceiling. Other lateral surfaces could be used, such as a plane parallel to whichever of the vertical walls is occupying a larger part of the view, according to a selection made during initialization. The x- anti z-coordinates of the direction to the vertical plane are the x- and z-coordinates of the vector defining the direction of gaze, and the y-coordinate is zero. The distance D from the origin to the vertical plane is the length of the projection of the radial position onto the direction of gaze, obtained by multiplying the x- and z-coordinates of the radial position from the appropriate one of boxes 266, 282, 284, or 290 by the x- and z-coordinates of the vector defining the direction of gaze, respectively.

The new position of the object is then found by finding the intersection of the vertical plane from box 292 with the new ray, in box 294. The coordinates of the new position of the center of the object are then returned in box 296.

D. Miscellaneous

The invention could be implemented in a wide variety of systems that present three-dimensional workspace. In addition, the invention could be implemented in a system that presents multiple three-dimensional workspaces and makes a transition between workspaces in response to an appropriate user request. One or more objects might be fastened to the viewpoint in such a way that they move with the viewpoint and follow transitions between workspaces. When a transition is made, the objects fastened to the viewpoint could be removed from the list of objects in the previous workspace and could be added to the list of objects in the new workspace. Other multiple workspace techniques could be included, as described in copending, coassigned U.S. patent application Ser. No. 07/030,766, issued as U.S. Pat. No. 5,072,412 entitled "User Interface with Multiple Workspaces for Sharing Display System Objects," incorporated herein by reference.

As noted above, the invention is applicable to a variety of three-dimensional workspaces, including not only those that provide a large number of depth cues but also those that are basically two-dimensional workspaces with one or a small number of depth cues such as overlapping objects or zooming to produce a perception of depth. More generally, the invention might be applicable to two-dimensional object motion in a two-dimensional workspace. For example, an object in a two-dimensional workspace could be moved toward a target object on an asymptotic path or on an acceleration path clipped with an asymptotic path.

The invention can be implemented with the animation techniques described in Robertson, G. G., Card, S. K., and Mackinlay, J. D., "The Cognitive Coprocessor Architecture for Interactive User Interfaces," *Proceedings of the ACM SIGGRAPH Symposium on User Interface Software and Technology*, Williamsburg, Va., Nov. 13–15, 1989, pp. 10–18, incorporated herein by reference.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed:

1. A method of operating a system that includes a display, a user input device set for providing signals, and a processor connected for receiving signals from the user input device set and for presenting images on the display; the user input device set including a first device through which a user can provide radial motion signals and a second device through which a user can provide lateral motion signals; the radial motion signals requesting radial motion along rays and the lateral motion signals requesting lateral motion in directions lateral to the rays;

the first and second devices being structured so that a user viewing an image presented on the display that includes an object in a three-dimensional workspace can request presentation of a sequence of images in which the object moves along a path within the three-dimensional workspace by operating the first and second devices to request concurrent radial motion and lateral motion independently; the radial motion being along rays extending from radial sources, with the user being able to request radial motion along any of a set of rays that extend in different directions from each radial source; the requested radial motion and lateral motion in combination being equivalent to motion along the path;

the method comprising:

presenting a first image on the display; the first image including a first object that is perceptible as having a first position within a three-dimensional workspace;

receiving a first radial motion signal from the first device and a first lateral motion signal from the second device; the first radial motion signal and the first lateral motion signal requesting a first radial motion of the first object and a first lateral motion of the first object; the first radial motion signal and the first lateral motion signal requesting that the first radial motion and the first lateral motion be concurrent; the first lateral motion signal indicating one of a set of rays that extends from a radial source in a direction that is not perpendicular to the display; the first radial motion and the first lateral motion in combination being equivalent to motion along a first path within the three-dimensional workspace; and in response to the first radial motion signal and the first lateral motion signal, presenting a second image on the display; the second image including a second object that is perceptible as a moved continuation of the first object at a second position within the three-dimensional workspace; the second position being perceptible as concurrently displaced along the first path from the first position both radially toward or away from the radial source along the indicated one of the set of rays and laterally in a direction lateral to the indicated one of the set of rays.

2. The method of claim 1 in which the first and second objects are perceptible as being viewed from a viewpoint, the viewpoint being the radial source; the second position being perceptible as displaced from the first position radially along the indicated one of the set of rays toward or away from the viewpoint.

3. The method of claim 2 in which the first radial motion is toward the viewpoint.

4. The method of claim 3 in which the first radial motion follows an acceleration path.

5. The method of claim 2 in which the first radial motion is away from the viewpoint.

6. The method of claim 5 in which the first radial motion follows an acceleration path.

7. The method of claim 1 in which the first lateral motion is in a plane.

8. A system comprising:

a display;

a user input device set for providing signals; and a processor connected for receiving signals from the user input device set and for presenting images on the display;

the user input device set including a first device through which a user can provide radial motion signals and a second device through which a user can provide lateral motion signals; the radial motion signals requesting radial motion along rays and the lateral motion signals requesting lateral motion in directions lateral to the rays; the first and second devices being structured so that a user viewing an image presented on the display that includes an object in a three-dimensional workspace can request presentation of a sequence of images in which the object moves along a path within the three-dimensional workspace by operating the first and second devices to request concurrent radial motion and lateral motion independently; the radial motion being along rays extending from radial sources, with the user being able to request radial motion along any of a set of rays that extend in different directions from each radial source; the requested radial motion and lateral motion in combination being equivalent to motion along the path;

the processor being operable to present a first image on the display; the first image including a first object that is perceptible as having a first position within a three-dimensional workspace;

the processor further being operable to receive a first radial motion signal from the first device and a first lateral motion signal from the second device; the first radial motion signal requesting a first radial motion of the first object and the first lateral motion signal requesting a first lateral motion of the first object; the first radial motion signal and the first lateral motion signal requesting that the first radial motion and the first lateral motion be concurrent; the first lateral motion signal indicating one of a set of rays that extends from a radial source in a direction that is not perpendicular to the display; the first radial motion and the first lateral motion in combination being equivalent to motion along a first path within the three-dimensional workspace;

the processor responding to the first radial motion signal and the first lateral motion signal by presenting a second image on the display; the second image including a second object that is perceptible as a moved continuation of the first object at a second position within the three-dimensional workspace; the second position being perceptible as concurrently displaced along the first path from the first position both radially toward or away from the radial source along the indicated one of the set of rays and laterally in a direction lateral to the indicated one of the set of rays.

9. The system of claim 8 in which the the user input device set comprises a mouse, the user requesting lateral motion by operating the mouse, the first lateral motion signal including data indicating mouse operation.

10. The system of claim 8 in which the user input device set comprises a keyboard, the user requesting radial motion by operating the keyboard, the first radial motion signal including data indicating keyboard operation.

11. The system of claim 10 in which the user requests radial motion toward or away from a radial source, the keyboard having a first key and a second key, the user operating the first key to request motion toward the radial source, the user operating the second key to request motion away from the radial source.

12. The system of claim 8 in which the first lateral motion signal indicates two-dimensional coordinates, the processor producing coordinates of the second position within the three-dimensional workspace by operating on the two-dimensional coordinates.

13. The system of claim 8 in which the first device comprises a keyboard.

14. The system of claim 8 in which the second device comprises a mouse.

15. A method of operating a system that includes a display, a user input device, and a processor connected for receiving signals from the user input device and for presenting images on the display; the user input device providing motion requesting signals from a user viewing images presented on the display that include objects in a three-dimensional workspace, the motion requesting signals requesting presentation of a sequence of images in which objects move along paths within the three-dimensional workspace;

the method comprising a sequence of iterations, the sequence of iterations including a first iteration and a number of following iterations, each following iteration having a next preceding iteration;

the first iteration comprising:
presenting a respective image on the display; the respective image of the first iteration including a respective object that is perceptible as having a respective position within a three-dimensional workspace;

each following iteration comprising:
receiving a respective motion requesting signal requesting motion of the respective object of the next preceding iteration toward a destination position within the three-dimensional workspace; the motion requesting signal requesting concurrent radial and lateral motion from the next preceding iteration's respective position toward the destination position; the requested radial motion and the requested lateral motion in combination being equivalent to motion along a path toward the destination position within the three-dimensional workspace; and presenting a respective image on the display; each respective image including a respective object that is perceptible as having a respective position within the three-dimensional workspace; the respective object of each following iteration being perceptible as a continuation of the respective object of the next preceding iteration, concurrently displaced both radially and laterally from the next preceding iteration's respective position; the respective position of each following iteration being displaced both radially and laterally along the path by a respective displacement from the respective position of the next preceding iteration; the act of presenting a respective image comprising:
operating the processor to automatically perform an asymptotic function to obtain the respective displacement;

the following iterations together obtaining a sequence of respective displacements so that the respective positions of the following iterations approach the destination position asymptotically along the path.

16. The method of claim 15 in which the respective objects are perceptible as being viewed from a viewpoint, the destination position being the viewpoint, the respective positions approaching the viewpoint asymptotically along the path.

17. The method of claim 15 in which each following iteration further comprises:

performing an animation loop, the acts of receiving the respective motion requesting signal and of presenting the respective image being included in the animation loop.

18. A method of operating a system that includes a display, a user input device, and a processor connected for receiving signals from the user input device and for presenting images on the display; the user input device providing motion requesting signals from a user viewing images presented on the display that include objects in a three-dimensional workspace, the motion requesting signals requesting presentation of a sequence of images in which objects move along paths within the three-dimensional workspace;

the method comprising a sequence of iterations, the sequence of iterations including a first iteration and a number of following iterations, each following iteration having a next preceding iteration;

the first iteration comprising:
presenting a respective image on the display, the respective image of the first iteration including a respective object that is perceptible as having a respective position within a three-dimensional workspace;

each following iteration comprising:
receiving a respective motion requesting signal requesting motion of the respective object of the next preceding iteration; the motion requesting signal requesting concurrent radial and lateral motion; the requested radial motion and the requested lateral motion in combination being equivalent to motion along a path within the three-dimensional workspace; and presenting a respective image on the display; each respective image including a respective object that is perceptible as having a respective position within the three-dimensional workspace; the respective object of each of the following iterations being perceptible as a continuation of the respective object of the next preceding iteration, concurrently displaced along the path both radially and laterally from the next preceding iteration's respective position;

the respective motion requesting signal of each of a first set of the following iterations requesting motion of the respective object of the next preceding iteration toward a destination position; the first set of following iterations including first phase iterations and second phase iterations; the first phase iterations preceding the second phase iterations; the respective position of each of the first set of following iterations being displaced both radially and laterally by a respective displacement from the respective position of the next preceding iteration; in each of the second phase iterations, the act of presenting a respective image comprising:
operating the processor to automatically perform an asymptotic function to obtain the respective displacement;

the following iterations together obtaining a sequence of respective displacements so that the respective positions of the first phase iterations accelerate toward the destination position along the path and so that the respective positions of the second phase iterations approach the destination position asymptotically along the path.

19. The method of claim 18 in which the respective objects are perceptible as being viewed from a viewpoint, the destination position being the viewpoint, the respective positions approaching the viewpoint asymptotically along the path.

20. The method of claim 18 in which each following iteration comprises:

performing an animation loop, the acts of receiving the respective motion requesting signal and of presenting the respective image being included in the animation loop.

21. The method of claim 18 in which the respective motion requesting signal of each of a second set of the following iterations requests motion of the respective object of the next preceding iteration away from the destination position; the respective positions of the second set of following iterations accelerating away from the destination position along the path.

22. The method of claim 21 in which the respective positions of the first phase iterations have a first rate of acceleration and the respective positions of the second set of following iterations have a second rate of acceleration; the first and second rates of acceleration having the same magnitude.

23. A method of operating a system that includes a display, a user input device, and a processor connected for receiving signals from the user input device and for presenting images on the display; the user input device providing motion requesting signals from a user viewing images presented on the display that include objects in a three-dimensional workspace, the motion requesting signals requesting presentation of a sequence of images in which objects move along paths within the three-dimensional workspace;

the method comprising a sequence of iterations, the sequence of iterations including a first iteration and a number of following iterations, each following iteration having a next preceding iteration;

the first iteration comprising:
presenting a respective image on the display, the respective image of the first iteration including a respective object that is perceptible as having a respective position within a three-dimensional workspace;

each following iteration comprising:
receiving a respective motion requesting signal requesting motion of the respective object of the next preceding iteration; the motion requesting signal requesting concurrent radial and lateral motion; the requested radial motion and the requested lateral motion in combination being equivalent to motion along a path toward the destination position within the three-dimensional workspace; and presenting a respective image on the display; each respective image including a respective object that is, perceptible as having a respective position within the three-dimensional workspace; the respective object of each of the following iterations being perceptible as a continuation of the respective object of the next preceding iteration, concurrently displaced along the path both radially and laterally from the next preceding iteration's respective position;

the respective motion requesting signal of each of a first set of the following iterations requesting motion of the respective object of the next preceding iteration toward a destination position; the respective position of each of the first set of following iterations being displaced both radially and laterally from the respective position of the next preceding iteration by a respective displacement; each of the following iterations in the first set further comprising:

determining the respective displacement by operating the processor to automatically perform a clipping operation on first and second functions, the first function being an acceleration function defining a first displacement to a first position that is on the path toward the destination position in the workspace; the second function being an asymptotic function defining a second displacement to a second position that is on the path toward the destination position in the three-dimensional workspace; the clipping operation choosing one of the first displacement and the second displacement; the respective object of each following iteration being perceptible as accelerating along the path when the clipping operation chooses the first displacement and as approaching the destination position asymptotically along the path when the clipping operation chooses the second displacement.

24. The method of claim 23 in which the respective objects are perceptible as being viewed from a viewpoint, the destination position being the viewpoint.

25. The method of claim 23 in which each following iteration comprises:

performing an animation loop, the acts of receiving the respective motion requesting signal and of presenting the respective image being included in the animation loop.

26. The method of claim 23 in which the respective motion requesting signal of each of a second set of the following iterations requests motion of the respective object of the next preceding iteration away from the destination position; the respective position of each of the second set of following iterations being displaced from the respective position of the next preceding iteration by a respective displacement: each of the following iterations in the second set further comprising:

determining the respective displacement using a third function, the third function being an acceleration function defining the respective displacement to the respective position so that the respective position is perceptible as accelerating away from the destination position.

27. The method of claim 26 in which the first function has a first rate of acceleration and the third function has a second rate of acceleration; the first and second rates of acceleration having the same magnitude.

28. A method of operating a system that includes a display, a user input device set for providing signals, and a processor connected for receiving signals from the user input device set and for presenting images on the display; the use input device set providing motion requesting signals requesting motion of objects; the motion requesting signals requesting radial motion along rays that each extend from a radial source and lateral motion in directions lateral to the rays;

the user input device set being structured so that a user viewing an image presented on the display that includes an object in a three-dimensional workspace can request presentation of a sequence of images in which the object moves along a path within the three-dimensional workspace by operating the user input device set to request concurrent radial motion and lateral motion independently; the radial motion being along rays extending from radial sources, with the user being able to request radial motion along any of a set of rays that extend in different directions from each radial source; the requested radial motion and lateral motion in combination being equivalent to motion along the path;

the method comprising a sequence of iterations, the sequence of iterations including a first iteration and a number of following iterations, each following iteration having a next preceding iteration; the number of following iterations being two or more;

the first iteration comprising:
  presenting a respective image on the display; the respective image including a respective object that is perceptible as having a respective position within a three-dimensional workspace;

each following iteration comprising:
  receiving a respective motion requesting signal from the user input device set, the motion requesting signal requesting radial motion and lateral motion of the next preceding iteration's respective object; the motion requesting signal requesting that the radial motion and the lateral motion be concurrent; the motion requesting signal indicating one of a set of rays that extends from a radial source in a direction that is not perpendicular to the display; and in response to the motion requesting signal, presenting a respective image on the display; the image including a respective object that is perceptible as a moved continuation of the next preceding iteration's respective object at a respective position within the three-dimensional workspace; the respective position being perceptible as concurrently displaced from the next preceding iteration's respective position both radially toward or away from the radial source along the indicated one of the set of rays and laterally in a direction lateral to the indicated one of the set of rays;

the motion requesting signal of each of the number of following iterations requesting radial motion in a first direction that is either toward or away from a radial source so that a request for radial motion in the first direction continues during the number of following iterations and the first iteration's respective object is perceptible as continuing to move, during the number of following iterations, along a path in the three-dimensional workspace that is equivalent to the combination of the requested lateral motion with the requested radial motion in the first direction.

29. A system comprising:
  a display;
  a user input device set for providing signals; and
  a processor connected for receiving signals from the user input device set and for presenting images on the display;
  the user input device set providing motion requesting signals requesting motion of objects; the motion requesting signals requesting radial motion along rays that each extend from a radial source and lateral motion in directions lateral to the rays;
  the user input device set being structured so that a user viewing an image presented on the display that includes an object in a three-dimensional workspace can request presentation of a sequence of images in which the object moves along a path within the three-dimensional workspace by operating the user input device set to request concurrent radial motion and lateral motion independently; the radial motion being along rays extending from radial sources, with the user being able to request radial motion along any of a set of rays that extend in different directions from each radial source; the requested radial motion and lateral motion in combination being equivalent to motion along the path;
  the processor being operable to present a first image on the display; the first image including a first object that is perceptible as having a first position within a three-dimensional workspace;
  the processor further being operable to receive a first motion requesting signal set from the user input device set, the first motion requesting signal set including two or more radial motion requesting signals; each radial motion requesting signal in the first motion requesting signal set requesting radial motion in a first direction that is either toward or away from a radial source so that a request for radial mot, on in the first direction continues during the first motion requesting signal set; each radial motion requesting signal indicating one of a set of rays that extends from a radial source in a direction that is not perpendicular to the display; the first motion requesting signal set requesting a first radial motion of the first object and a first lateral motion of the first object; the first motion requesting signal set requesting that the first radial motion and the first lateral motion be concurrent;

the processor responding to the first motion requesting signal set by presenting a sequence of images on the display; each image in the sequence including an object that is perceptible as a moved continuation of the preceding image's object at a position within the three-dimensional workspace; each image's position being perceptible as concurrently displaced both radially in the first direction from the radial source along the indicated one of the set of rays and laterally in a direction lateral to the indicated one of the set of rays from the preceding image's position so that the first object is perceptible as continuing to move, during the sequence of images, along a first path in the three-dimensional workspace that is equivalent to the combination of the first lateral motion with the first radial motion;

the sequence of images including a last image with a last object in a last position that is perceptible as displaced along the first path from the first position to the last position.

30. A method of operating a system that includes a display, a user input device set, and a processor connected for receiving signals from the user input device set and for presenting images on the display; the user input device set providing motion requesting signals from a user viewing images presented on the display that include objects in a three-dimensional workspace, the motion requesting signals requesting presentation of a sequence of images in which objects move along paths within the three-dimensional workspace;

the method comprising a sequence of iterations, the sequence of iterations including a first iteration and a number of following iterations, the number of following iterations being two or more; each following iteration having a next preceding iteration;

the first iteration comprising:
    presenting a respective image on the display; the respective image of the first iteration including a respective object that is perceptible as having a respective position within a three-dimensional workspace;

each following iteration comprising:
    receiving a respective motion requesting signal from the user input device set requesting motion of the respective object of the next preceding iteration toward a destination position within the three-dimensional workspace; the motion requesting signal indicating the destination position; the motion requesting signal requesting concurrent radial and lateral motion from the next preceding iteration's respective position toward the destination position; the requested radial motion and the requested lateral motion in combination being equivalent to motion along a path toward the destination position within the three-dimensional workspace;

using the destination position indicated by the motion requesting signal to automatically obtain a respective position within the three-dimensional workspace; the iteration's respective position being displaced both radially and laterally from the next preceding iteration's respective position; and presenting a respective image on the display; each respective image including a respective object that is perceptible as having the automatically obtained respective position; the respective object of each following iteration being perceptible as a continuation of the respective object of the next preceding iteration, concurrently displaced along the path both radially and laterally from the next preceding iteration's respective position;

the automatically obtained respective position of each of the following iterations being on the path toward the destination position indicated by the iteration's motion requesting signal; the respective position of each following iteration being displaced toward the destination position by a respective displacement from the respective position of the next preceding iteration; in each following iteration, the act of using the destination position comprising:

operating the processor to automatically perform an asymptotic function to obtain the respective displacement;

the following iterations together obtaining a sequence of respective displacements so that the respective positions of the following iterations approach the destination position asymptotically along the path.

31. A method of operating a system that includes a display, a user input device set, and a processor connected for receiving signals from the user input device set and for presenting images on the display; the user input device set providing motion requesting signals from a user viewing images presented on the display that include objects in a three-dimensional workspace, the motion requesting signals requesting presentation of a sequence of images in which objects move along paths within the three-dimensional workspace;

the method comprising a sequence of iterations, the sequence of iterations including a first iteration and a number of following iterations, the number of following iterations being two or more; each following iteration having a next preceding iteration;

the first iteration comprising:

presenting a respective image on the display; the respective image of the first iteration including a respective object that is perceptible as having a respective position within a three-dimensional workspace;

each following iteration comprising:

receiving a respective motion requesting signal from the user input device set requesting motion of the respective object of the next preceding iteration toward a destination position within the three-dimensional workspace; the motion requesting signal indicating the destination position; the motion requesting signal requesting concurrent radial and lateral motion from the next preceding iteration's respective position toward the destination position; the requested radial motion and the requested lateral motion in combination being equivalent to motion along a path toward the destination position within the three-dimensional workspace;

using the destination position indicated by the motion requesting signal to automatically obtain a respective position within the three-dimensional workspace; the iteration's respective position being displaced both radially and laterally from the next preceding iteration's respective position; and presenting a respective image on the display; each respective image including a respective object that is perceptible as having the automatically obtained respective position; the respective object of each following iteration being perceptible as a continuation of the respective object of the next preceding iteration, concurrently displaced along the path both radially and laterally from the next preceding iteration's respective position;

the following iterations including first phase iterations and second phase iterations; the first phase iterations preceding the second phase iterations; the automatically obtained respective position of each first phase iteration and the automatically obtained respective position of each second phase iteration being on the path toward the destination position indicated by the iteration's motion requesting signal; the respective position of each following iteration being displaced by a respective displacement from the respective position of the next preceding iteration; in each second phase iteration, the act of using the destination position comprising:

operating the processor to automatically perform an asymptotic function to obtain the respective displacement;

the following iterations together obtaining a sequence of respective displacements so that the respective positions of the first phase iterations accelerate toward the destination position along the path and so that the respective positions of the second phase iterations approach the destination position asymptotically along the path.

32. A method of operating a system that includes a display, a user input device set, and a processor connected for receiving signals from the user input device set and for presenting images on the display; the user input device set providing motion requesting signals from a user viewing images presented on the display that include objects in a three-dimensional workspace, the motion requesting signals requesting presentation of a sequence of images in which objects move along paths within the three-dimensional workspace;

the method comprising a sequence of iterations, the sequence of iterations including a first iteration and a number of following iterations, the number of following iterations being two or more; each following iteration having a next preceding iteration;

the first iteration comprising:

presenting a respective image on the display; the respective image of the first iteration including a respective object that is perceptible as having a respective position within a three-dimensional workspace;

each following iteration comprising:

receiving a respective motion requesting signal from the user input device set requesting motion of the respective object of the next preceding iteration toward a destination position within the three-dimensional workspace; the motion requesting signal indicating the destination position; the motion requesting signal requesting concurrent radial and lateral motion from the next preceding iteration's respective position toward the destination position; the requested radial motion and the requested lateral motion in combination being equivalent to motion along a path toward the destination position within the three-dimensional workspace;

using the destination position indicated by the motion requesting signal to automatically obtain a respective position within the three-dimensional workspace; the iteration's respective position being displaced both radially and laterally from the next preceding iteration's respective position; and presenting a respective image on the display; each respective image including a respective object that is perceptible as having the automatically obtained respective position; the respective object of each following iteration being perceptible as a continuation of the respective object of the next preceding iteration, concurrently displaced along the path both radially and laterally from the next preceding iteration's respective position; the automatically obtained respective position of each of the following iterations being displaced from the respective position of the next preceding iteration by a respective displacement; in each of the following iterations, the act of using the destination position to automatically obtain a respective position comprising:

determining the respective displacement by operating the processor to automatically perform a clipping operation on first and second functions, the first function being an acceleration function defining a first displacement to a first position that is on the path toward the destination position indicated by the motion requesting signal; the second function being an asymptotic function defining a second displacement to a second position that is on the path toward the destination position indicated by the motion requesting signal; the clipping operation choosing one of the first displacement and the second displacement; the respective object of each following iteration being perceptible as accelerating along the path when the clipping operation chooses the first displacement and as approaching the destination position asymptotically along the path when the clipping operation chooses the second displacement.

\* \* \* \* \*